US006179465B1

United States Patent
Yam

(10) Patent No.: US 6,179,465 B1
(45) Date of Patent: Jan. 30, 2001

(54) METHOD AND APPARATUS FOR INFRARED PYROMETER CALIBRATION IN A THERMAL PROCESSING SYSTEM USING MULTIPLE LIGHT SOURCES

(75) Inventor: Mark Yam, San Jose, CA (US)

(73) Assignee: Applied Materials, Inc., Santa Clara, CA (US)

( * ) Notice: Under 35 U.S.C. 154(b), the term of this patent shall be extended for 0 days.

(21) Appl. No.: 08/861,519

(22) Filed: May 22, 1997

Related U.S. Application Data

(63) Continuation-in-part of application No. 08/623,433, filed on Mar. 28, 1996, now Pat. No. 5,762,419, which is a continuation-in-part of application No. 08/506,902, filed on Jul. 26, 1996, now Pat. No. 5,820,261.

(51) Int. Cl.[7] .................................................. G01K 15/00
(52) U.S. Cl. ........................... 374/2; 374/131; 250/252.1
(58) Field of Search .................................. 374/2, 131, 1; 250/252.1 A, 495.1

(56) References Cited

U.S. PATENT DOCUMENTS

| | | | | |
|---|---|---|---|---|
| 4,286,327 | * | 8/1981 | Rosenthal et al. | 250/338.4 |
| 4,544,418 | | 10/1985 | Gibbons | 438/565 |
| 4,627,008 | * | 12/1986 | Rosenthal | 250/338.1 |
| 5,134,302 | * | 7/1992 | Rosenthal | 250/338.1 |
| 5,155,336 | | 10/1992 | Gronet et al. | 219/411 |
| 5,217,285 | | 6/1993 | Sopori | 362/1 |
| 5,265,957 | | 11/1993 | Moslehi et al. | 374/1 |
| 5,317,492 | | 5/1994 | Gronet et al. | 362/294 |
| 5,324,937 | | 6/1994 | Chen et al. | 250/252.1 |
| 5,324,979 | * | 6/1994 | Rosenthal | 250/338.1 |
| 5,326,170 | | 7/1994 | Moslehi et al. | 374/2 |
| 5,448,082 | | 9/1995 | Kim | 257/82 |
| 5,525,539 | | 6/1996 | Kim | 438/37 |
| 5,608,213 | * | 3/1997 | Pinkus et al. | 250/330 |
| 5,623,149 | | 4/1997 | Kilmer | 250/495.1 |
| 5,762,419 | * | 6/1998 | Yam | 374/2 |
| 5,820,261 | * | 10/1998 | Yam | 374/2 |

FOREIGN PATENT DOCUMENTS

| | | | |
|---|---|---|---|
| 32 21 382 | 12/1982 | (DE) | . |
| 0 718 610 A1 | 6/1996 | (EP) | . |
| 0 756 159 A1 | 1/1997 | (EP) | . |
| 0 798 547 A2 | 10/1997 | (EP) | . |
| 2056669 | 3/1981 | (GB) | . |
| 2101306 * | 1/1983 | (GB) | . |
| 54-34285 | 3/1979 | (JP) | . |
| 55-99035 | 7/1980 | (JP) | . |
| 56-49929 | 5/1981 | (JP) | . |
| 57-131027 | 8/1982 | (JP) | 374/2 |
| 62-022036 | 1/1987 | (JP) | 374/2 |
| WO 92/05413 * | 4/1992 | (WO) | 250/495.1 |

OTHER PUBLICATIONS

Bryant et al., "Infrared absorption measurements in the field using LED sources," Power Engineering Journal, pp. 56–60, Mar. 1992.

Pyzhkov et al., "Stable source of infrared radiation for photometer calibration," Measurement Techniques, pp. 278–9 vol. 29, No. 4., Apr. 19, 1986.

* cited by examiner

*Primary Examiner*—Diego Gutierrez
*Assistant Examiner*—Stanley J. Pruchnic, Jr.
(74) *Attorney, Agent, or Firm*—Fish & Richardson

(57) ABSTRACT

A calibration instrument for calibrating a temperature probe, such as pyrometer. The calibration instrument uses two stable light sources, such as light emitting diodes, to simulate a blackbody of a known temperature.

15 Claims, 14 Drawing Sheets

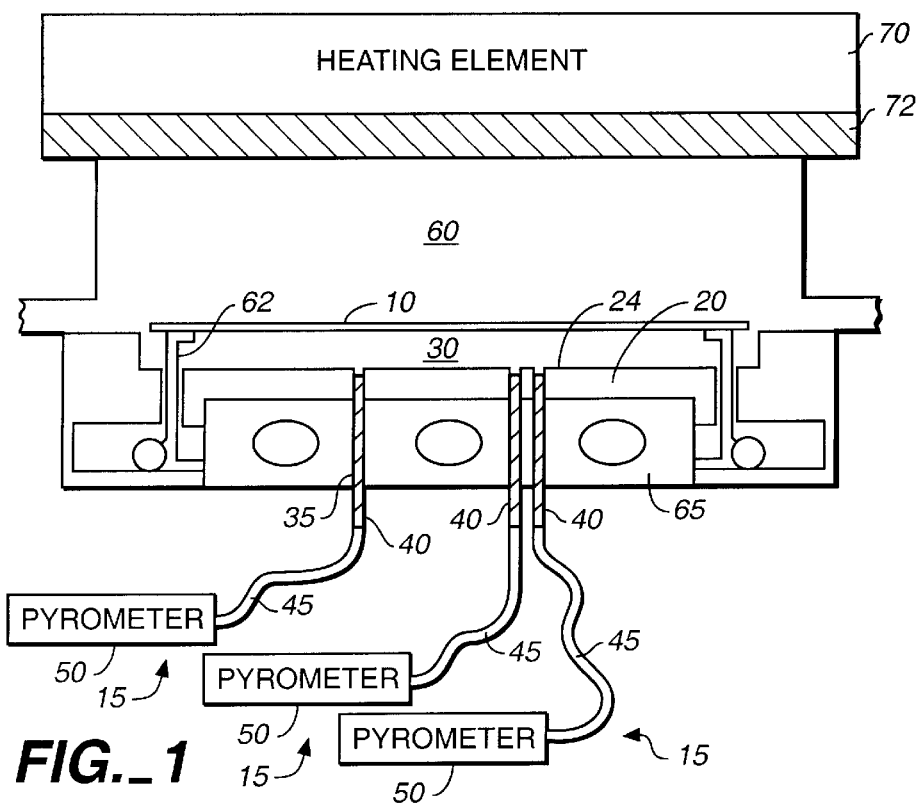
FIG._1
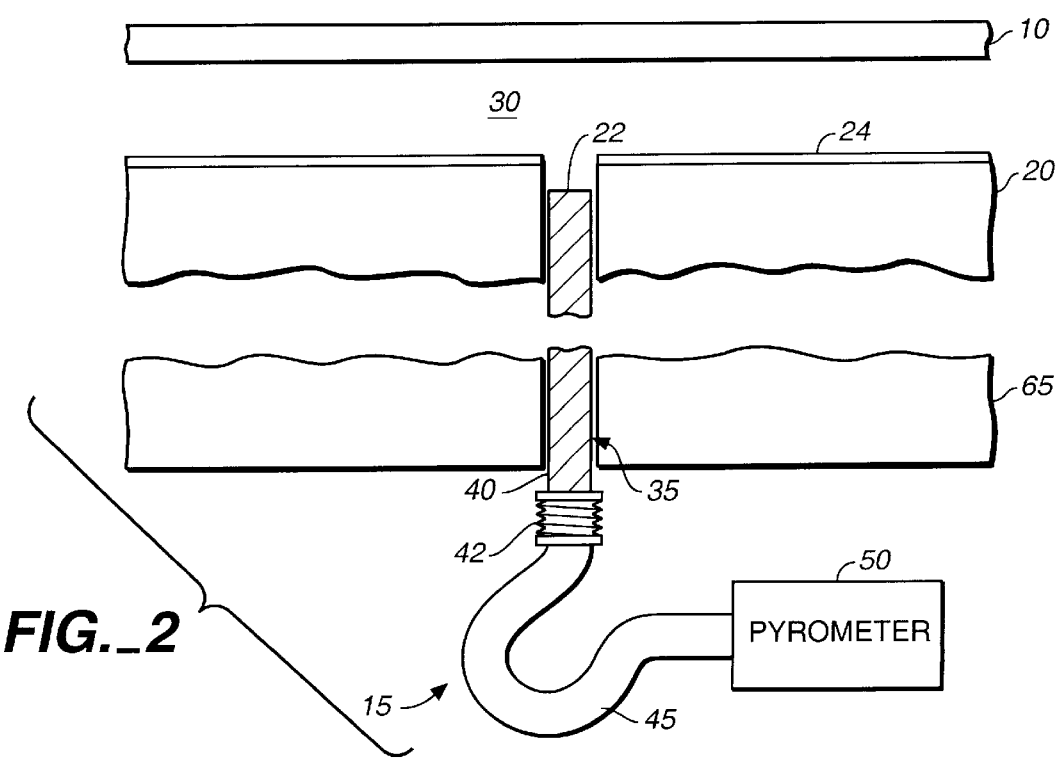
FIG._2

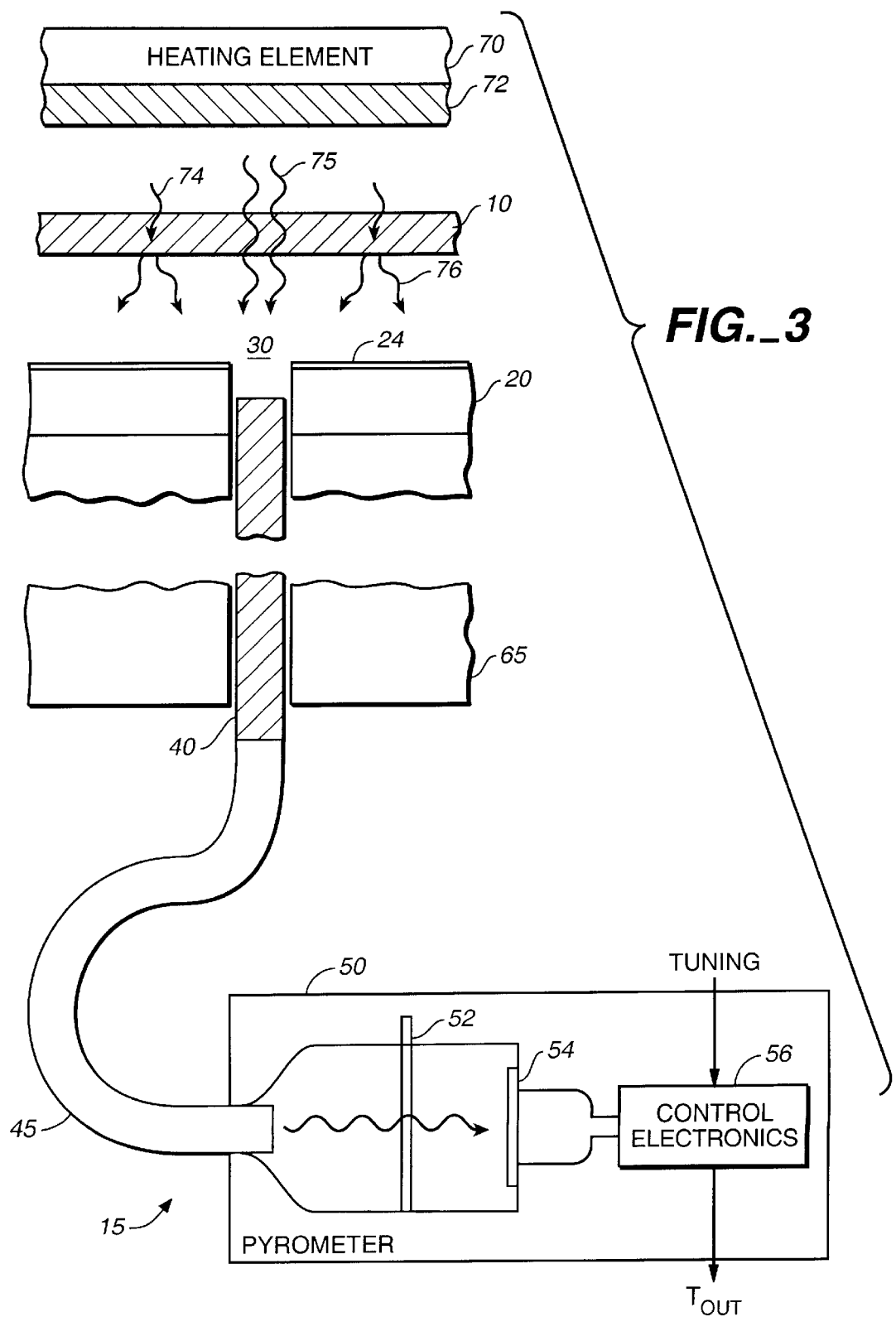
FIG._3

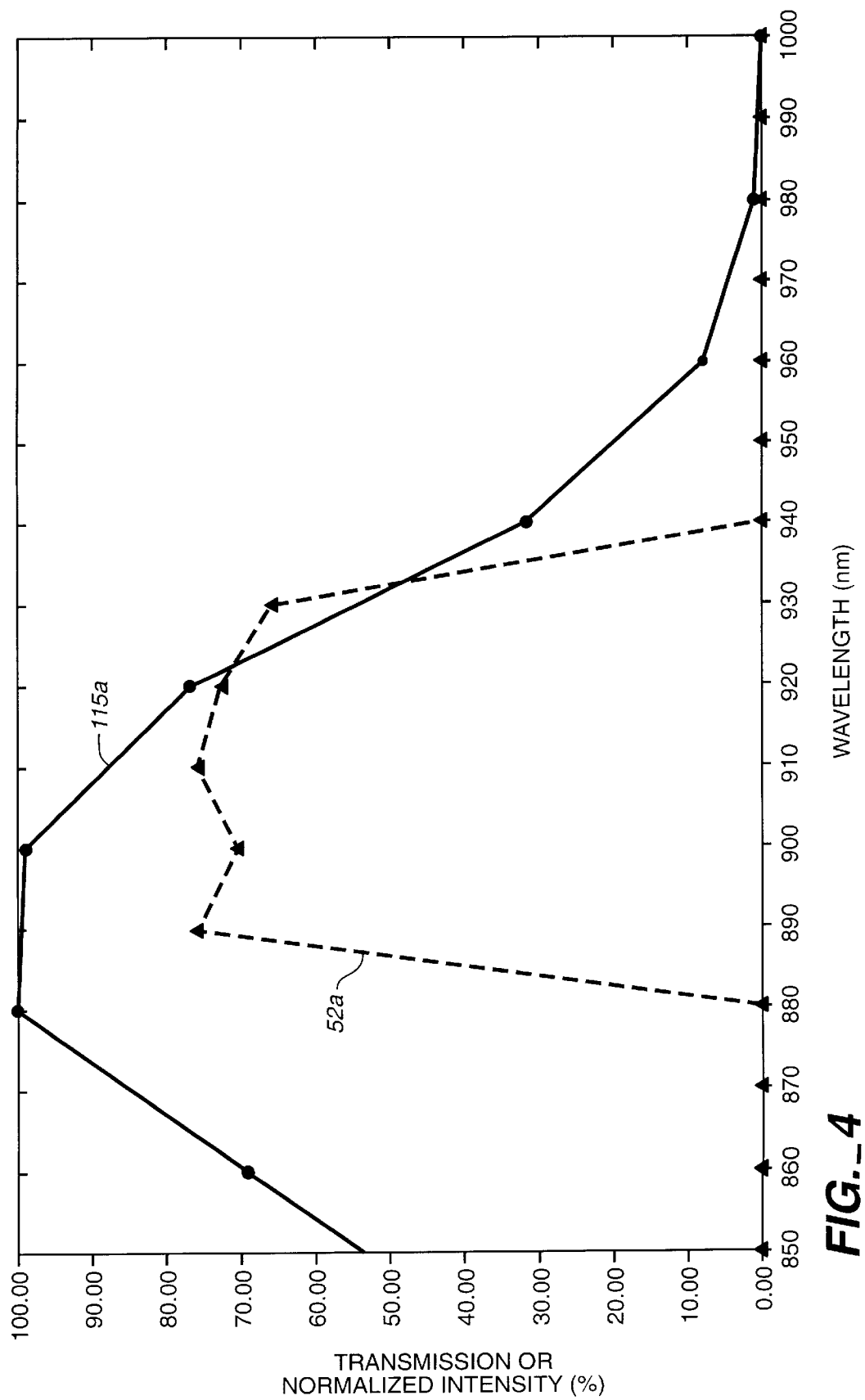
FIG._4

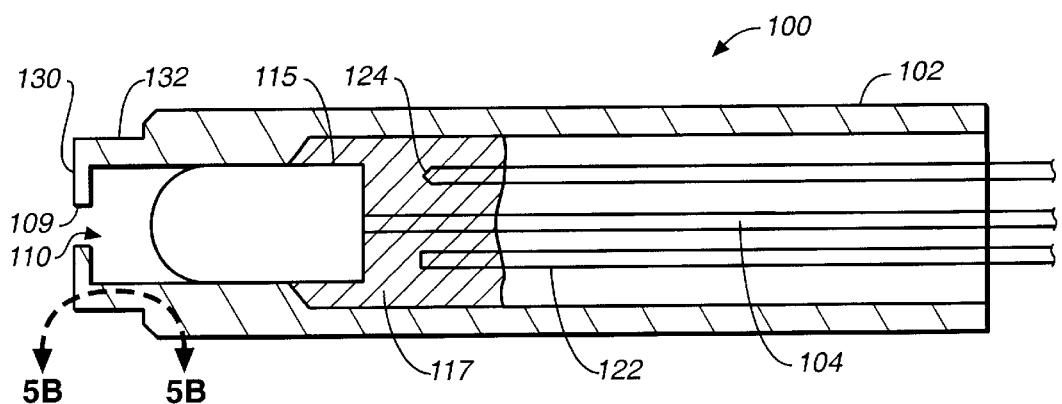
FIG._5A
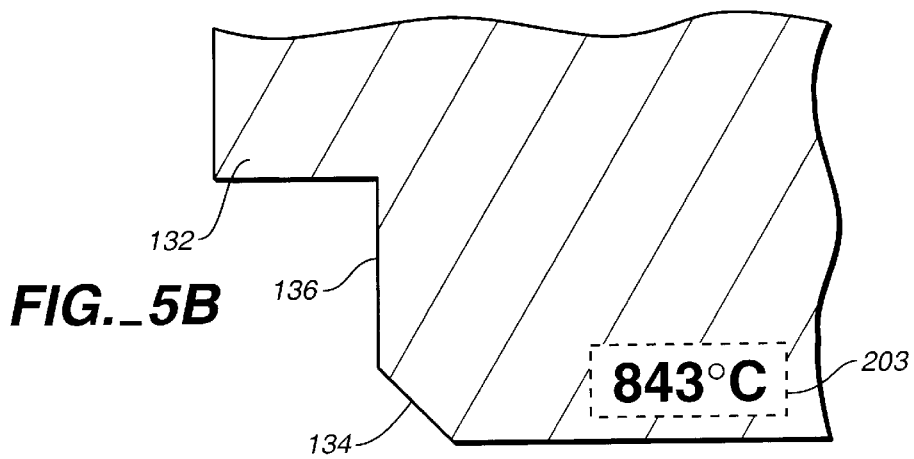
FIG._5B
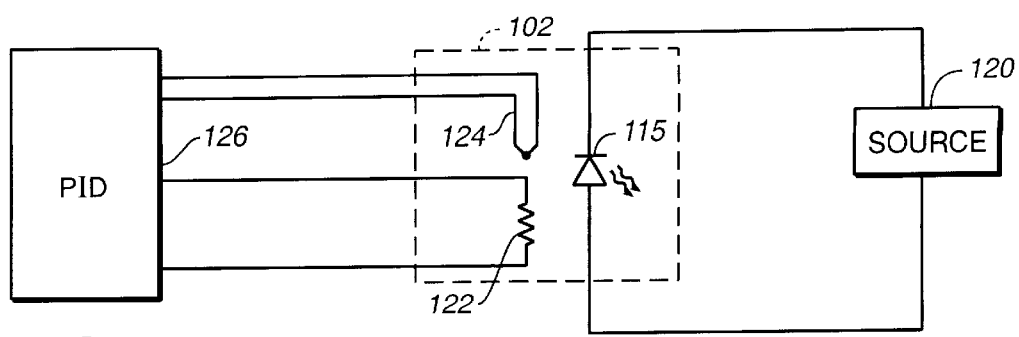
FIG._6

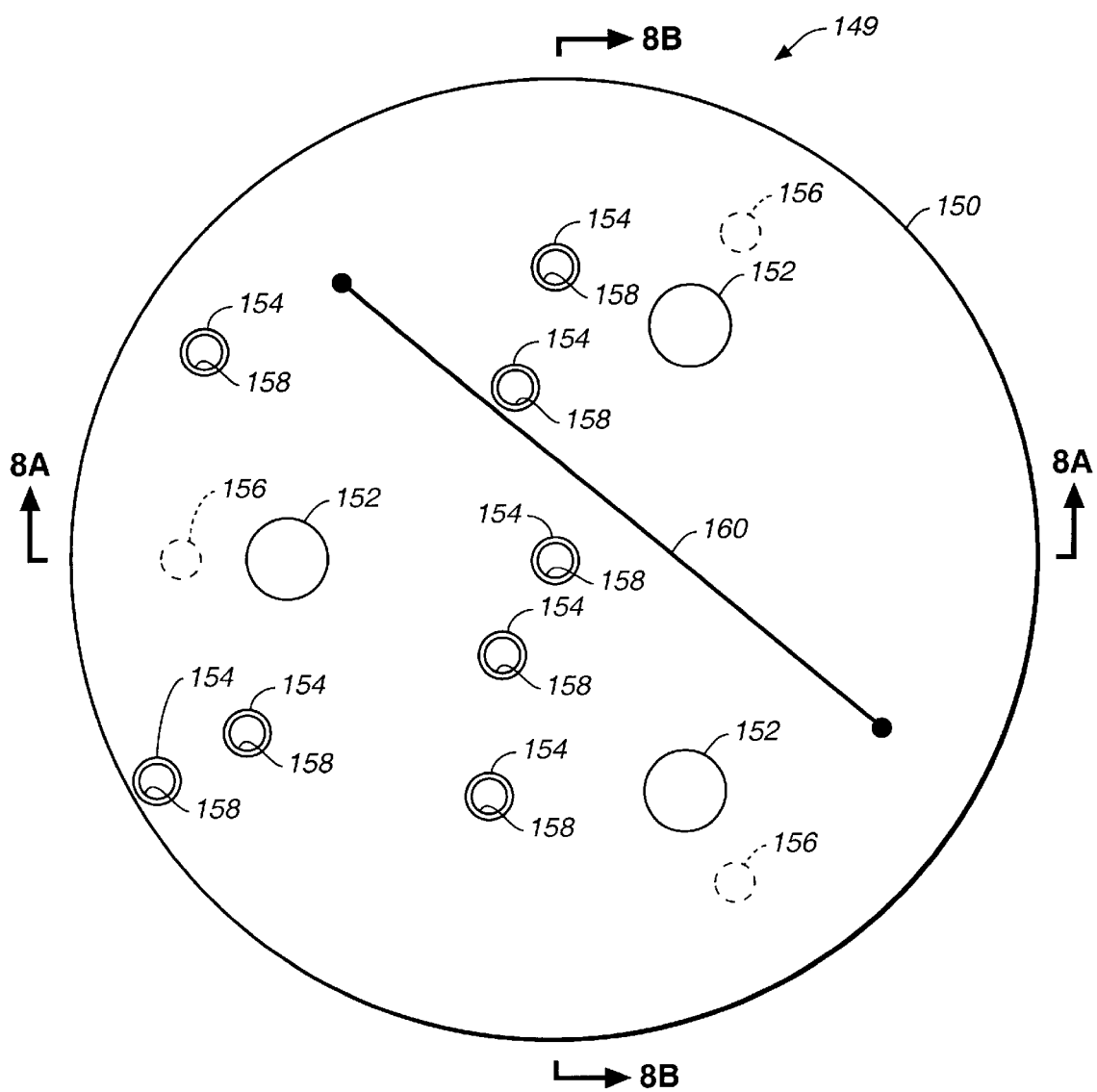
FIG._7

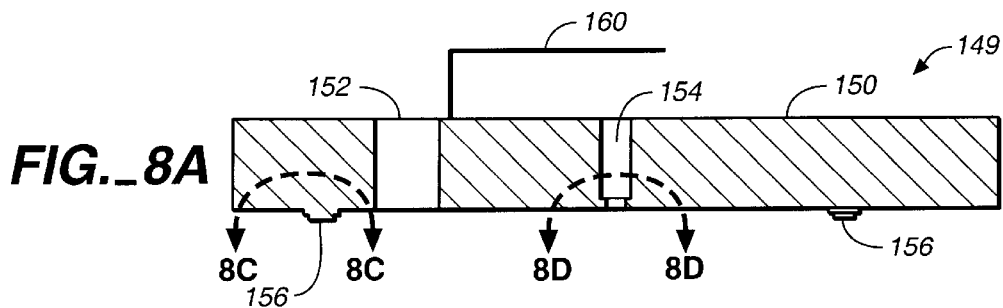
*FIG._8A*
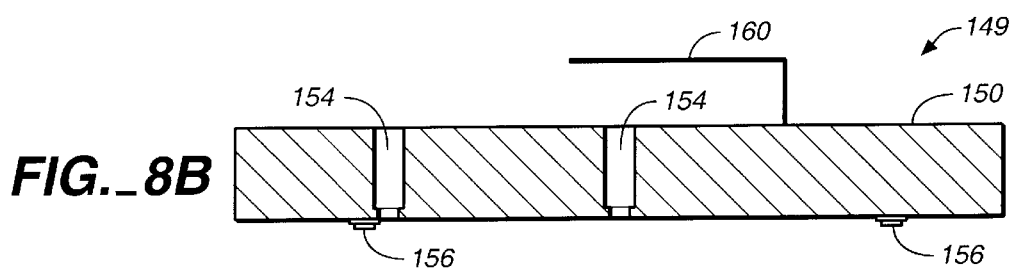
*FIG._8B*
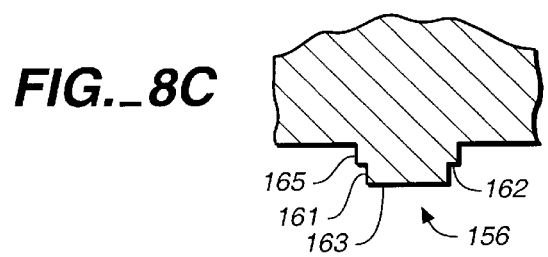
*FIG._8C*
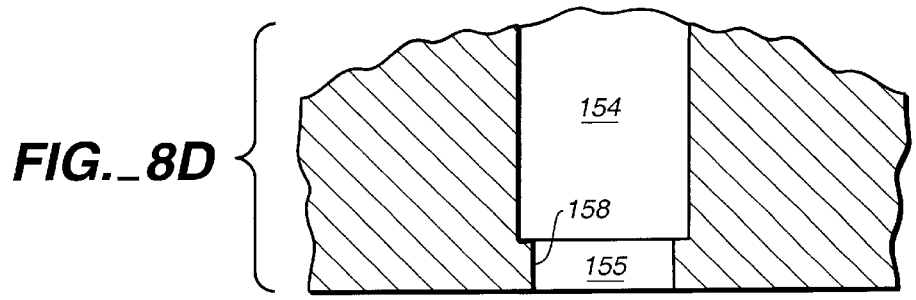
*FIG._8D*

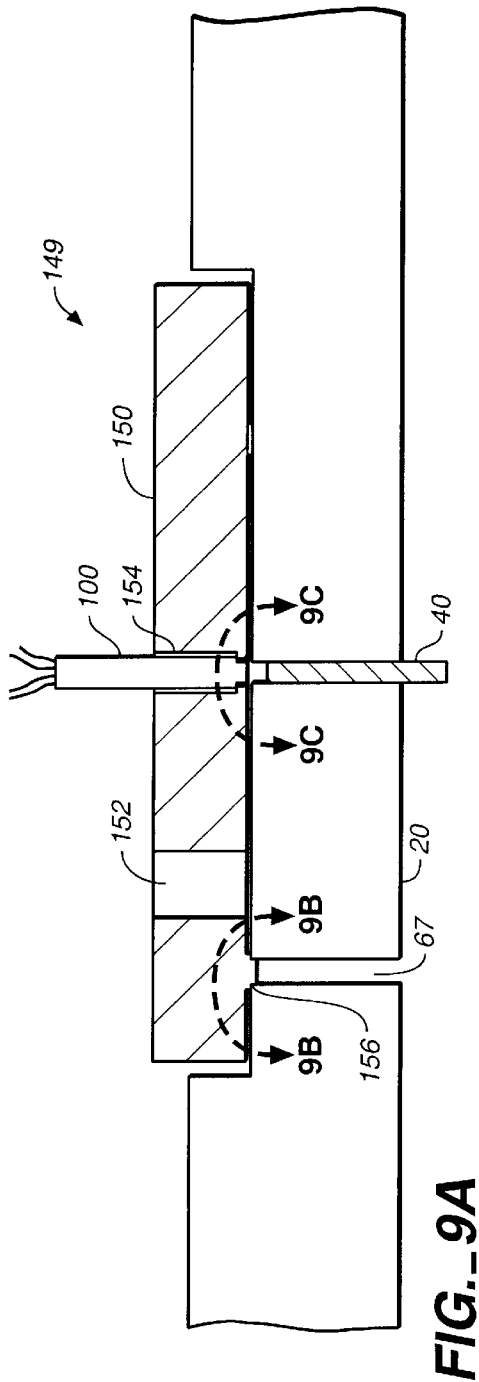
FIG._9A
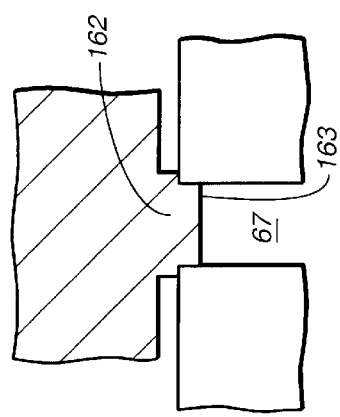
FIG._9B
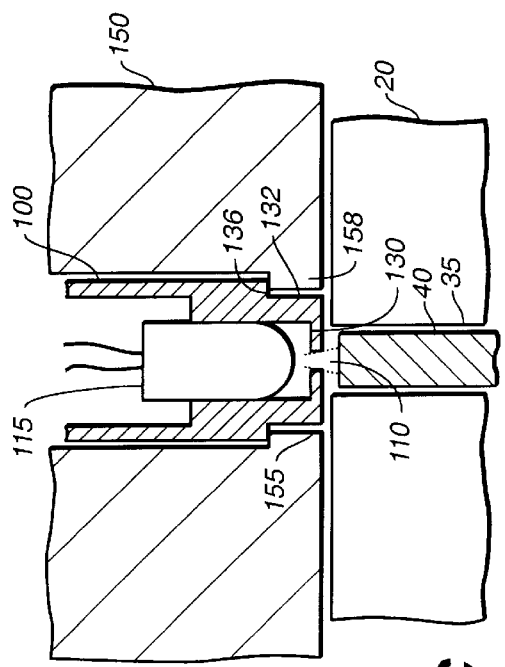
FIG._9C

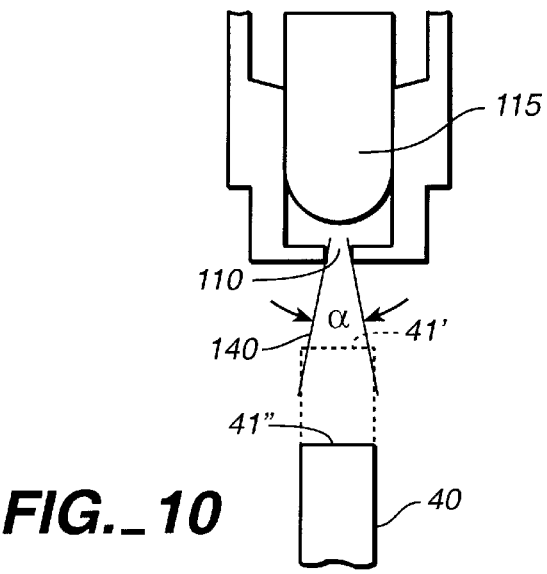
FIG._10
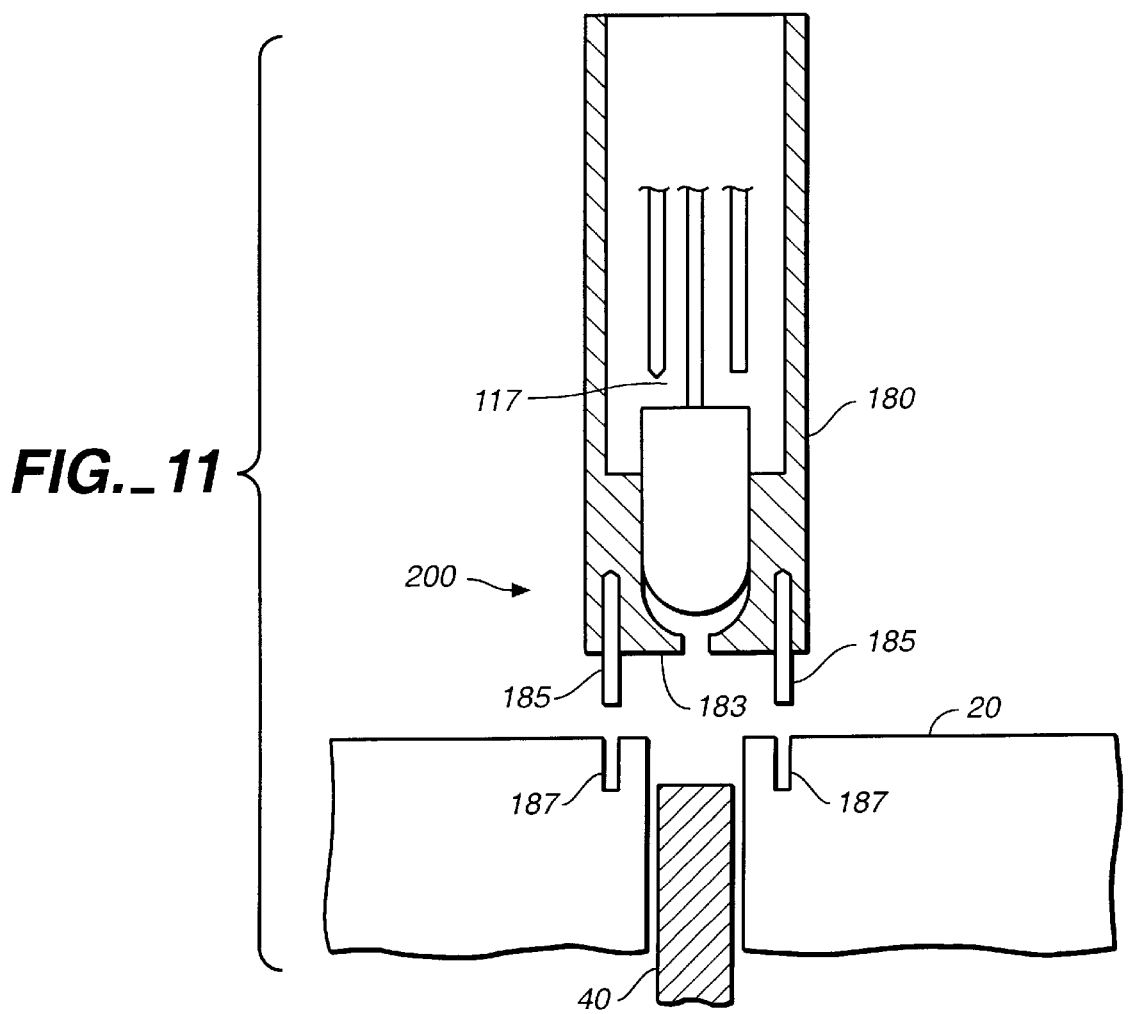
FIG._11

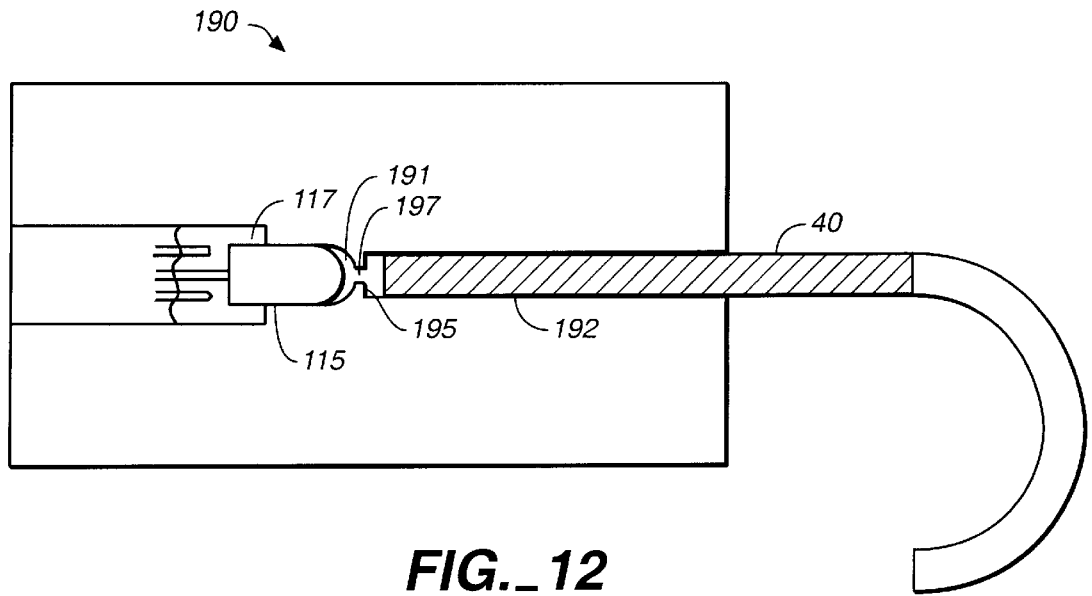
FIG._12
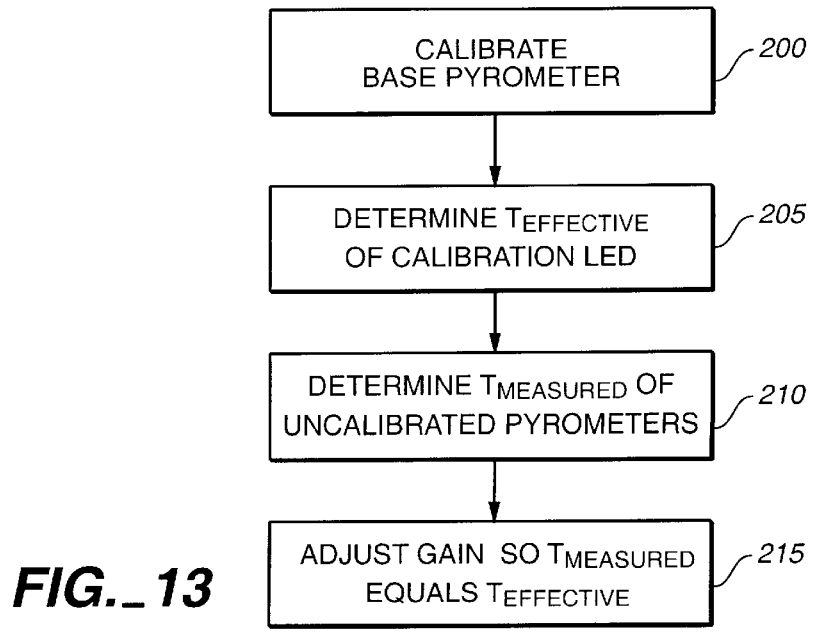
FIG._13

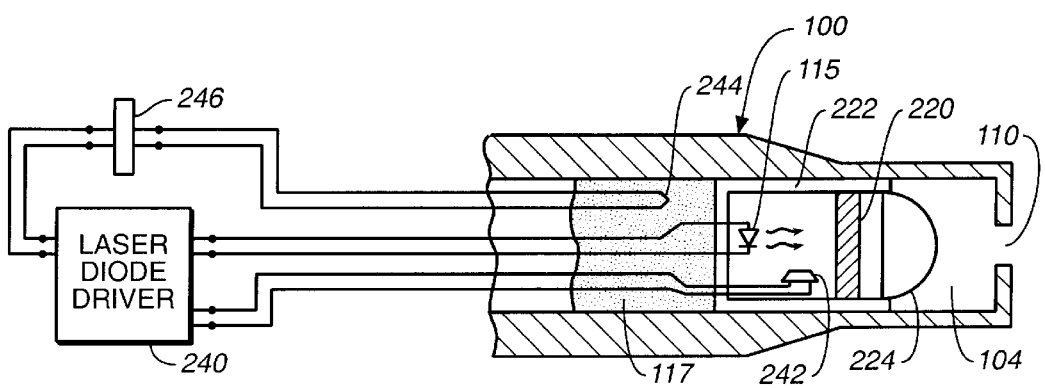
FIG._14
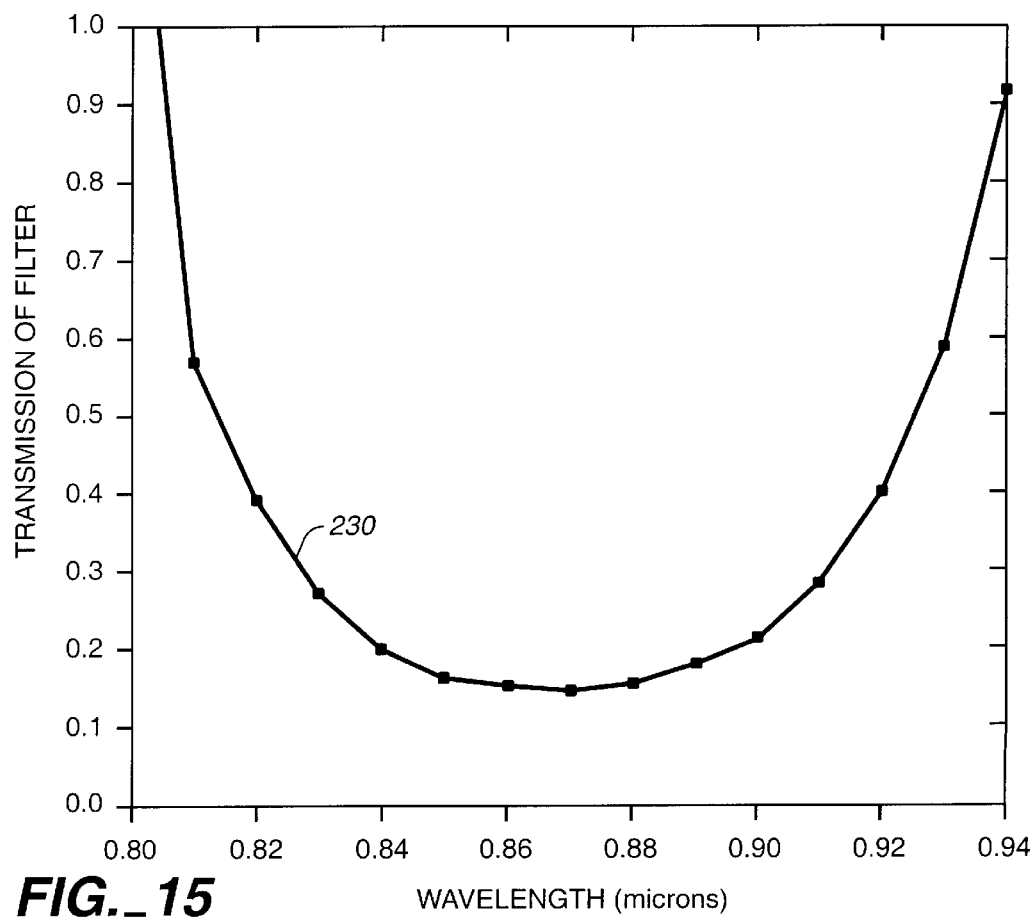
FIG._15

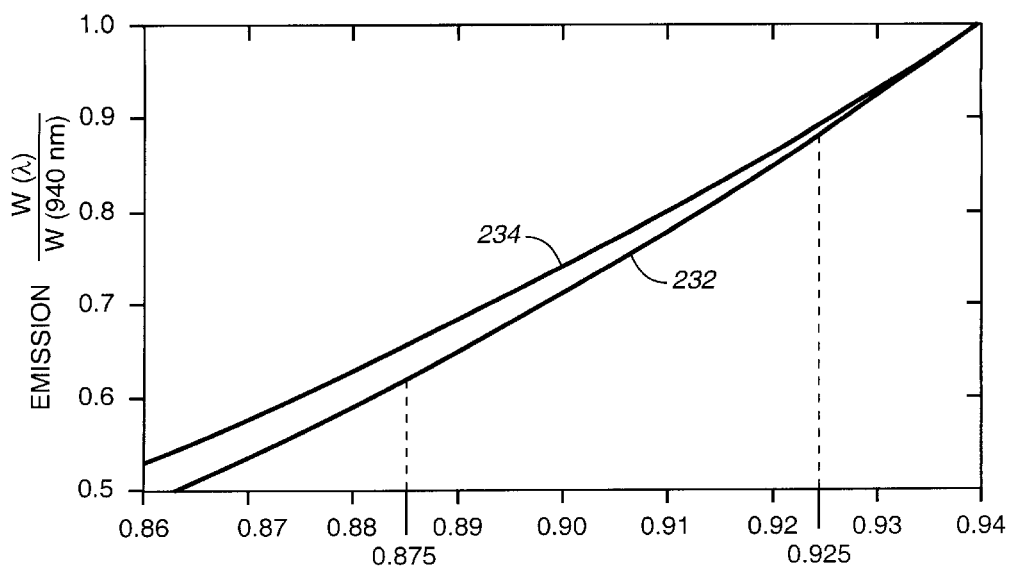
FIG._16
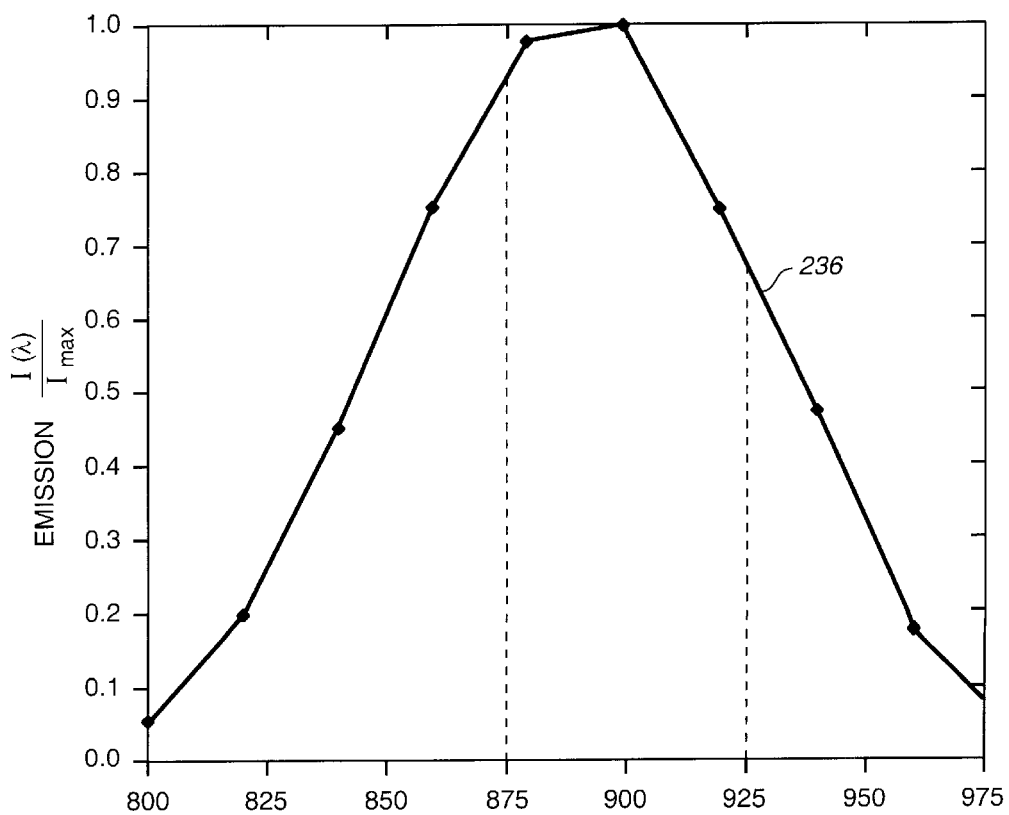
FIG._17

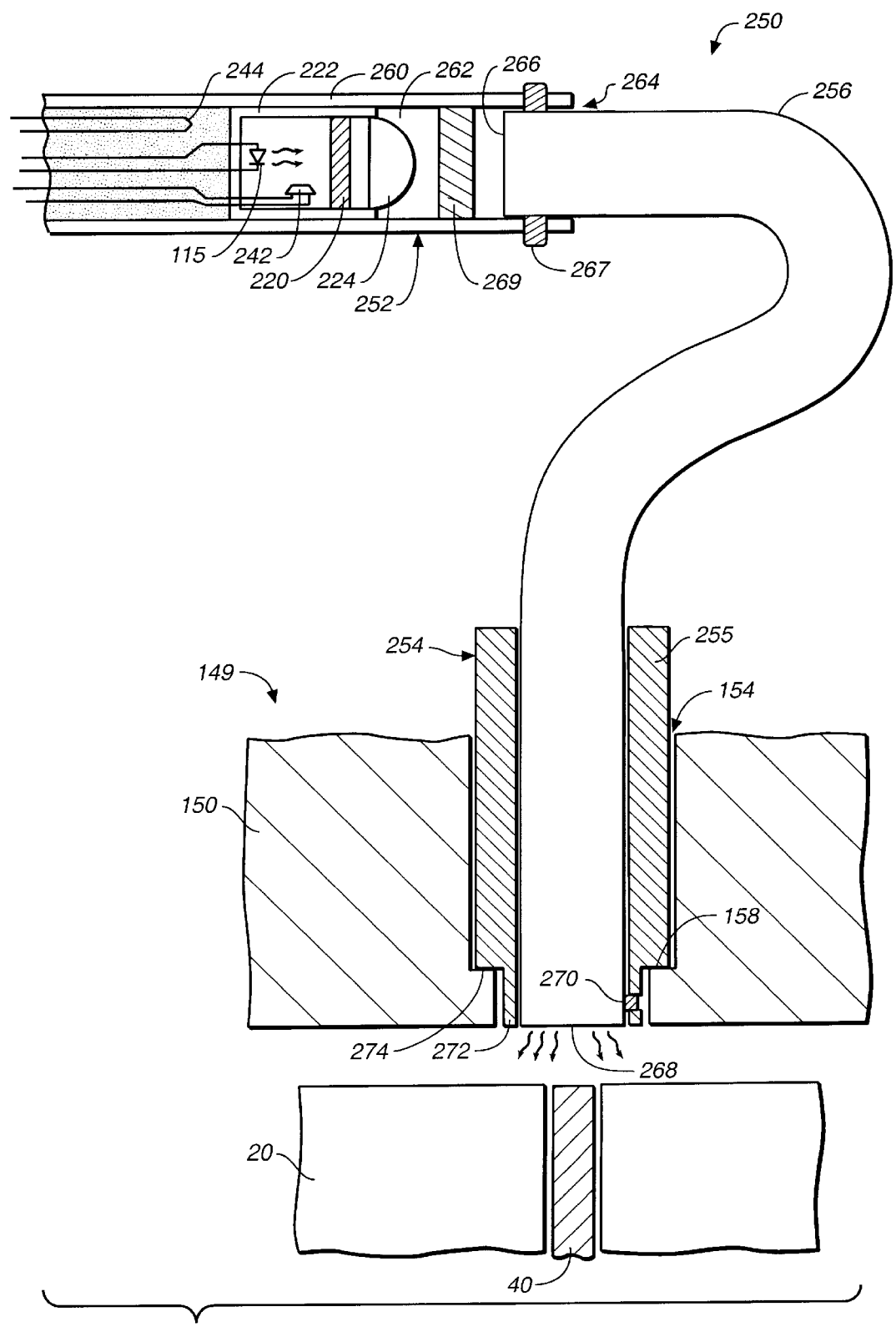
FIG._18

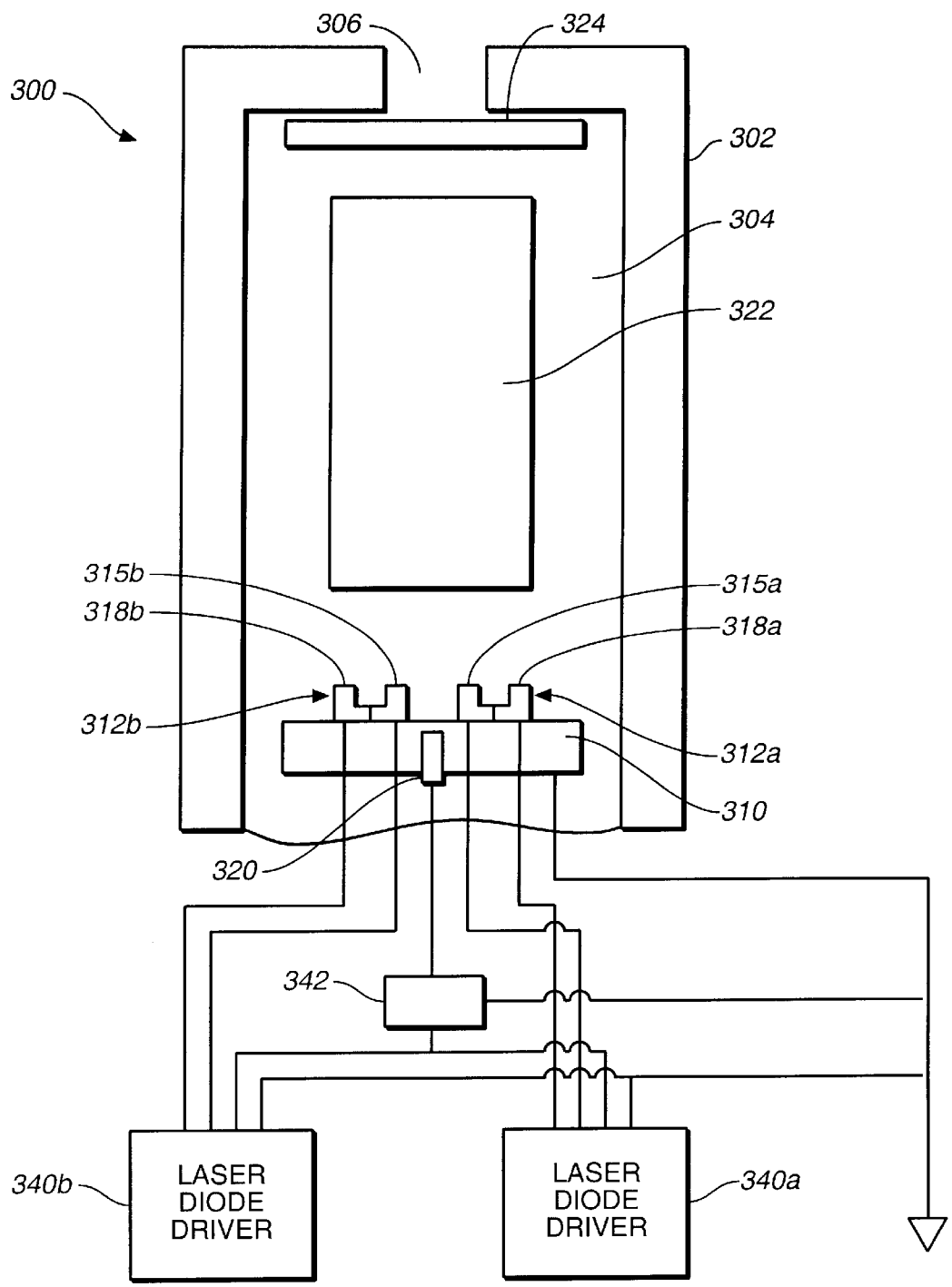
FIG._19

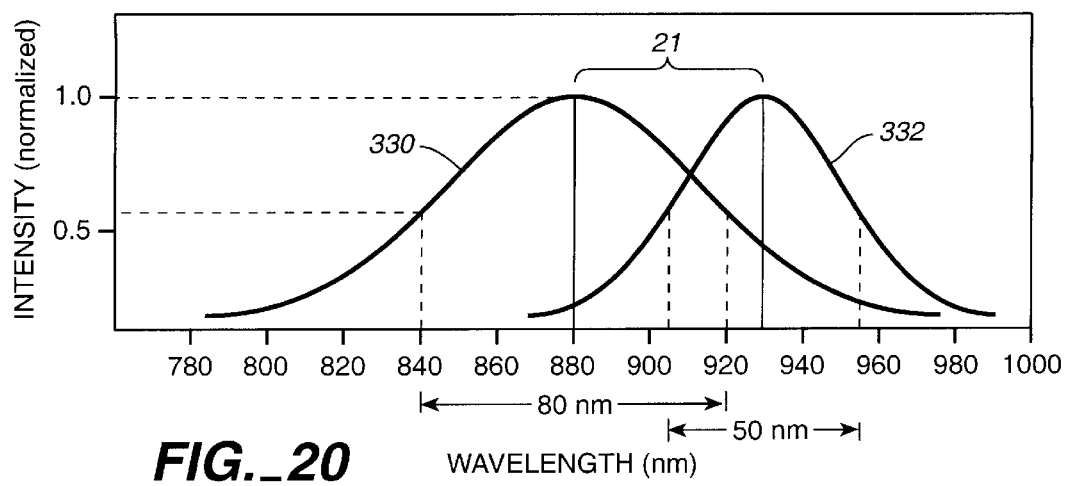
FIG._20
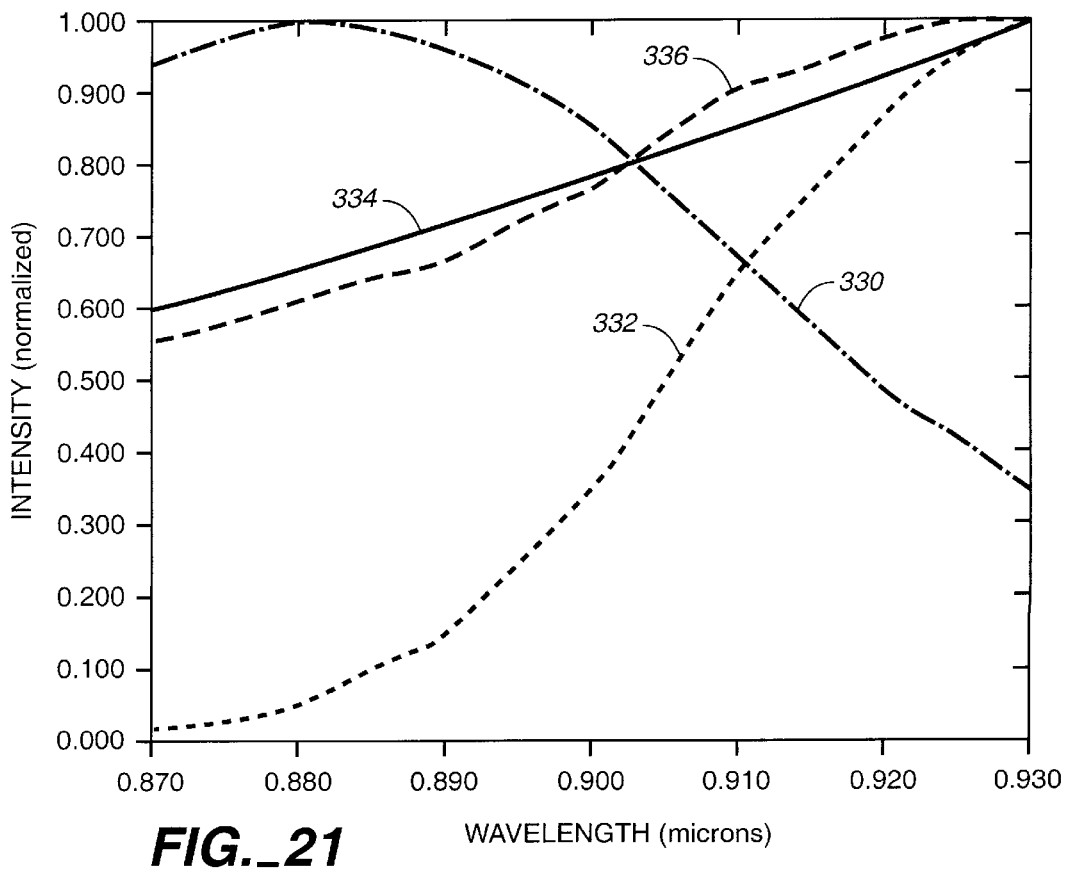
FIG._21

METHOD AND APPARATUS FOR INFRARED PYROMETER CALIBRATION IN A THERMAL PROCESSING SYSTEM USING MULTIPLE LIGHT SOURCES

CROSS REFERENCE TO RELATED APPLICATIONS

This United States patent application is a Continuation-in-Part of U.S. patent application Ser. No. 08/623,433, filed Mar. 28, 1996, now U.S. Pat. No. 5,762,419, which is a Continuation-in-Part of U.S. patent application Ser. No. 08/506,902, filed Jul. 26, 1995, now U.S. Pat. No. 5,820,261.

BACKGROUND OF THE INVENTION

The present invention relates to calibrating pyrometers that are used in thermal processing systems.

In rapid thermal processing (RTP), a substrate is heated quickly to a high temperature, such as 1200° C., to perform a fabrication step such as annealing, cleaning, chemical vapor deposition, oxidation, or nitridation. Particularly given the submicron dimensions of current devices, to obtain high yields and process reliability, the temperature of the substrate must be precisely controlled during these thermal processing steps. For example, to fabricate a dielectric layer 60–80 Å thick with a uniformity of ±2 Å, which is typical of requirements in current device structures, the temperature in successive processing runs cannot vary by more than a few ° C. from the target temperature. To achieve this level of temperature control, the temperature of the substrate is measured in real time and in situ.

Optical pyrometry is a technology that is used to measure substrate temperatures in RTP systems. An optical pyrometer using an optical probe samples the emitted radiation intensity from the substrate, and computes the temperature of the substrate based on the spectral emissivity of the substrate and the ideal blackbody radiation-temperature relationship.

When the system is first set up, the optical probe must be calibrated so that it produces a correct temperature reading when exposed to the radiation coming from the heated substrate. In addition, during repeated use, the temperature sensed by the probe might change over time and thus it will be necessary to recalibrate the probe or at least detect the change that has occurred so that corrective action can be taken. For example, the light pipe which is used to sample the radiation being emitted from the substrate as it is being heated, may become dirty or chipped, connections along the optical column transferring the sampled light to the pyrometer may loosen, or the electronic components in the pyrometer may "drift".

A commonly used method of calibrating the pyrometer is to use a special substrate or wafer in the chamber. The special substrate, which can be purchased from commercial sources, has a previously measured, known emissivity, and it has an "embedded" thermocouple which is attached to the substrate with a ceramic material. When the substrate is heated, its actual temperature is indicated by the thermocouple. Since the substrate's emissivity is known, the radiation that is actually emitted by the substrate can be easily calculated by multiplying the intensity of radiation that would be expected from by an ideal blackbody that is at the predetermined temperature times the emissivity of the substrate. This is the radiation level that will be sampled by the optical probe of the pyrometer. The pyrometer is adjusted so that it produces a temperature reading that corresponds to the actual temperature.

Unfortunately, this method has drawbacks. The actual temperature of the substrate may in fact be different from the temperature measured by the thermocouple. First, the presence of the embedded thermocouple and the ceramic material causes the area with the thermocouple to have a different temperature than other parts of the wafer, i.e., it disturbs the temperature profile on the substrate. Second, at high temperatures (e.g., 1000° C. as is commonly found in RTP processes), the joint between the wafer and thermocouple tends to degrade, so that after four or five uses the thermocouple readings become unreliable. Because of these shortcomings, this calibration technique cannot really guarantee pyrometer accuracy that is better than ten to fifteen ° C.

In addition, there are difficulties associated with placing a thermocoupled substrate inside the chamber and making electrical connection to the thermocouple.

Accordingly, it would be useful if an optical probe could be calibrated accurately without using a wafer with a an embedded thermocouple.

SUMMARY OF THE INVENTION

In one aspect, the invention is directed to an apparatus for calibrating a temperature probe. The apparatus includes a first light source to emit light having a first spectral range and a second light source to emit light having a second spectral range. The second spectral range is different from the first spectral range. A light emitting region is optically coupled to the first and second light sources, and the relative intensities of the first and second light sources are selected such that the total radiation emitted from the light emitting region substantially simulates a blackbody at a predetermined temperature over a predetermined wavelength range.

Implementations of the invention may include the following. The apparatus may include an alignment mechanism, such as an alignment structure to engage a corresponding alignment feature of a thermal processing chamber or to engage the input end of the temperature probe, to align the light emitting region with an input end of the temperature probe. A light combiner may be positioned to receive light from the first and second light sources and direct the combined light to the light emitting region. The first and second light sources may each emit light with an approximately gaussian intensity distribution and have intensity peaks at different wavelengths. The first and second light sources may be LEDs, and the predetermined wavelength range may be in the infrared. The light emitting region may be a surface of an optical fiber or an aperture in a structure enclosing the first and second light sources.

In another aspect, the invention may be directed to a method of calibrating a temperature probe. A first light source generates light having a first spectral range and a second light source generates light having a second spectral range. The second bandwidth is different from the first bandwidth. The light from the first and second light sources is combined and directed to a light emitting region. The relative intensities of the first and second light sources are selected such that a radiation spectrum emitted from the light emitting region substantially simulates a radiation spectrum of a blackbody at a predetermined temperature over a predetermined wavelength range.

In another aspect, the invention may be directed to a method of calibrating a calibration instrument. Light having a first spectral range is generated from a first light source in the calibration instrument, and light having a second spectral range is generated from a second light source in the calibration instrument. The second spectral range is different from the first spectral range. The light from the first and second light sources is combined, and the intensity of the combined light is measured at a first wavelength and at a second wavelength. The relative intensities of the first and second light sources are adjusted such that a ratio of the intensity at the first wavelength to the intensity at the second wavelength is substantially equal to an intensity ratio predicted for a blackbody at a predetermined temperature.

Implementations of the invention include the following. If the first spectral range overlaps a portion of the second spectral range, then the first wavelength may be within the overlapping portion and the second wavelength may be outside the first spectral range. If the first and second spectral range do not overlap, then the first wavelength may be selected such that the first and second light sources have approximately equal normalized intensities at the first wavelength.

Among the advantages of the invention are the following. The spectral output of the calibration instrument closely simulates a blackbody at a specific temperature. Blackbody radiation may be simulated without the use of a calibration filter. The pyrometer may be accurately (e.g., less than 1° C. error) calibrated without using a wafer with an embedded thermocouple. Calibration may be performed more quickly and using less energy. Calibration may be traced to an absolute standard. The pyrometer may be calibrated without removing the light pipe from the chamber. The calibration instrument may be portable and sturdy.

Other features and advantages will be apparent from the following description, including the drawings and the claims.

BRIEF DESCRIPTION OF THE DRAWINGS

FIG. 1 shows a rapid thermal processing chamber;

FIG. 2 shows a temperature sensing probe;

FIG. 3 shows a temperature sensing probe;

FIG. 4 is a graph of transmission of a pyrometer filter and normalized light intensity of an LED, both as a function of wavelength;

FIG. 5A shows a cross-section of a calibration probe;

FIG. 5B is an enlarged view of FIG. 5A;

FIG. 6 is a circuit diagram of a calibration probe;

FIG. 7 is a top view of an alignment tool;

FIGS. 8A and 8B are cross-sectional views of the alignment tool shown in FIG. 7 taken along lines 8A—8A and 8B—8B, respectively;

FIGS. 8C and 8D are enlarged views of FIG. 8A;

FIG. 9A shows a the alignment tool of FIG. 7 with a calibration probe mounted therein;

FIGS. 9B and 9C are enlarged views of FIG. 9A;

FIG. 10 shows the light beam from a calibration probe;

FIG. 11 shows another embodiment of a calibration probe with an alignment tool attached thereto;

FIG. 12 shows yet another embodiment of a calibration instrument;

FIG. 13 is a flow chart of a calibration procedure using the calibration instrument;

FIG. 14 shows still another embodiment of a calibration probe;

FIG. 15 is a graph of the transmission of a calibration filter as a function of wavelength;

FIG. 16 is a graph of the emission of a blackbody, normalized at about 0.94 microns, as a function of wavelength;

FIG. 17 is a graph of the emission of an LED as a function of wavelength;

FIG. 18 shows yet another embodiment of a calibration probe;

FIG. 19 shows a calibration probe using two LEDs;

FIG. 20 is a graph of the emission curves as a function of wavelength of the LEDs from the calibration probe of FIG. 19; and FIG. 21 is an exploded view of region 21 of FIG. 20 including the emission curves of the two LEDs, a blackbody, and the calibration probe.

In the following description of the invention, the same structures illustrated in different Figures are referred to with the same reference numerals.

DESCRIPTION OF THE PREFERRED EMBODIMENT(S)

Before describing the details of a pyrometer calibration tool which is used to calibrate pyrometers within an RTP system, we will first describe an RTP system which includes the pyrometers that are to be calibrated. Referring to FIGS. 1 and 2, in general an RTP system includes a processing chamber 60 for processing a diskshaped, eight-inch (200 mm) diameter silicon substrate 10. The substrate 10 is held inside chamber 60 by a substrate support structure 62 and is heated by a heating element 70 (e.g., an array of tungsten halogen lamps) located directly above the substrate. Heating element 70 generates radiation which enters chamber 60 through a water-cooled quartz window 72 located approximately one inch above substrate 10. Beneath substrate 10 is a reflector plate 20 which is mounted on a stainless steel base 65. Reflector plate 20 may be made of aluminum and have a highly reflective surface coating 24 (e.g., a gold alloy). The underside of substrate 10 and the top of reflector plate 20 form a reflecting cavity 30 which makes the substrate appear more like an ideal blackbody; i.e., it produces an increased effective emissivity for the substrate.

A conduit 35 extending from the backside of base 65 through the top of reflector plate 20 holds a sapphire light pipe 40 which acts as the input probe of a temperature probe 15 that includes a pyrometer 50. An input end 22 of light pipe 40 is located near (e.g., flush with) the top of reflector plate 20 and samples radiation from reflecting cavity 30. Sampled radiation passes down light pipe 40, through a flexible optical fiber 45, and into pyrometer 50. The coupled ends of optical fiber 45 and sapphire light pipe 40 are held in close optical contact with each other by a threaded connector 42. There are a plurality of temperature probes 15 (e.g., eight) positioned in reflector plate 20 to sample radiation at different radii of the substrate.

In the described embodiment, sapphire light pipe 40 may be about 0.05 to 0.125 inches in diameter (e.g., 0.080), and pyrometer 50 may be a Luxtron Accufiber Model 100, available from Luxtron Corporation of Santa Clara, Calif. A more complete description of an RTP system along with an explanation of how the reflecting cavity acts to produce a virtual blackbody may be found in U.S. patent application Ser. No. 08/359,302 (U.S. Pat. No. 5,660,472), entitled METHOD AND APPARATUS FOR MEASURING SUBSTRATE TEMPERATURES, filed Dec. 19, 1994, assigned to assignee of the present application, and incorporated herein by reference.

Inside pyrometer 50, as shown in FIG. 3, radiation from optical fiber 45 passes first through an optical pyrometer filter 52 before falling onto a silicon detector 54 (e.g., a photodiode). The signal from detector 54 is input to control electronics 56 which converts that signal to a temperature reading $T_{out}$ which is used by power control circuitry (not shown) for the lamps. Control electronics 56 includes a lookup table (not shown) that is used to convert the measured current into a output temperature reading $T_{out}$. The lookup table maps the measured output signal to the corresponding temperature of an ideal blackbody, which can be readily derived from Planck's law, in a manner well known to persons skilled in the art. Control electronics 56 also includes a gain control terminal by which the gain of the control electronics may be adjusted during calibration so that the pyrometer outputs an accurate temperature reading.

In normal operation, the heating element 70, such as a lamp array, directs radiation to substrate 10. Some of that radiation (i.e., radiation 74) is absorbed by the substrate and some of it (i.e., radiation 75) is transmitted through the substrate into cavity 30. The substrate also emits radiation 76, the intensity of which is a function of the temperature of the substrate. Typically, a silicon wafer transmits radiation with a wavelength greater than about 1.0 microns; whereas, silicon detector 54 responds to radiation having a wavelength up to 1.5 microns. If transmitted radiation is permitted to reach silicon detector 54, it will produce an erroneous temperature reading. Therefore, to prevent transmitted radiation from reaching detector 54 and interfering with the temperature measurement, the bandpass characteristics of pyrometer filter 52 are selected to prevent the transmitted radiation from the lamps from reaching the detector. In the described embodiment, pyrometer filter 52 is glass coated with an optical stack, e.g., a quarter-wave stack, which transmits light in a narrow range of wavelengths (e.g. 0.89 to 0.93 microns) and has very high rejection above 1.0 microns. The transmission of pyrometer filter 52 as a function of wavelength is shown by dashed line 52*a* in FIG. 4.

To calibrate the pyrometer, a special calibration instrument is used (see FIGS. 9A–9C, 11, and 12). The calibration instrument includes a stable light source, such as a light emitting diode (LED), which emits radiation primarily in the narrow spectrum defined by pyrometer filter 52. The stable light source simulates a blackbody at a predetermined temperature. That is, over a predetermined wavelength range, it emits the same amount of radiation over the spectrum of interest as would a blackbody that is heated to the predetermined temperature. The predetermine wavelength range may be in the infrared. The calibration instrument, several embodiments of which are described below, aligns the light source with the input end of the sapphire light pipe so that a known and repeatable amount of radiation enters the sapphire light pipe during each calibration run.

The light source is constructed and/or selected to "match" pyrometer filter 52. That is, its maximum output and its spectral range coincide with the bandpass region of pyrometer filter 52. Referring to FIG. 4, the characteristics of an LED that is used with the previously described pyrometer filter 52 are shown by solid line 115*a*. The LED has an approximately gaussian spectral distribution which is about 0.2 microns wide with a maximum intensity from about 0.88 to 0.90 microns.

Referring to FIG. 14, a calibration filter 220 may be placed between an LED 115 and an aperture 110 so that calibration instrument 100 simulates a blackbody. That is, calibration filter 220 causes the light emitted from the calibration instrument to have the same relative intensity, as a function of wavelength, as a blackbody of a predetermined temperature. The calibration filter may be positioned inside a shell 222 of the LED, e.g., between a lens 224 and diode element 115. Alternately, calibration filter 220 may be positioned in a cavity 104 in calibration instrument 100 between lens 224 and aperture 110.

The transmission characteristics of calibration filter 220 are selected, as will be described below, to compensate for the difference between LED 115 and an ideal blackbody. Referring to FIG. 15, the transmission curve, i.e., the transmission as a function of wavelength, of calibration filter 220 is shown by solid line 230. The transmission curve 230 of calibration filter 220 is approximately parabolic, with a minimum transmission (e.g., about 0.15) at a wavelength of about 0.87 microns. Calibration filters with specified transmission curves may be ordered from filter manufacturers. When light from LED 115 passes through calibration filter 220, the resulting light intensity simulates a blackbody at a predetermined temperature, e.g., 950° C., over most of the spectral emission range of the LED, e.g., from 0.80 to 0.94 microns.

The transmission curve of calibration filter 220 is derived from the emission curves, i.e., the light intensity as a function of wavelength, of a blackbody and the LED. Specifically, the transmission curve of calibration filter 220 is calculated by dividing the emission curve of a blackbody by the emission curve of LED 115. The emission curve of a blackbody at a predetermined temperature may be derived from Plank's law. Referring to FIG. 16, the emission curve for a blackbody at a temperature of 950° C. is shown by solid line 232, whereas the emission curve for a blackbody at a temperature of 1050° C. is shown by solid line 234. Emission curves 232 and 234 have been normalized at about 0.94 microns; i.e., the light intensity at wavelengths below 0.94 microns is shown as a percentage of the light intensity at 0.94 microns. The emission curve of LED 115 may be measured by a spectrograph. Referring to FIG. 17, the emission curve of one LED, specifically an OD88FHT driven at 30 watts, in calibration instrument 100 is shown by solid line 236. To generate transmission curve 230 for calibration filter 220 in calibration instrument 100 to simulate a predetermined temperature of 950° C., blackbody emission curve 232 is divided by LED emission curve 236.

Calibration filter 220 enables different pyrometers, particularly pyrometers with differing pyrometer filters 52, to be accurately calibrated with the same calibration instrument. The transmission curves of pyrometer filters 52 differ from pyrometer to pyrometer. For example, one pyrometer filter may transmit light having wavelengths between 0.92 and 0.93 microns, whereas another pyrometer filter may transmit light having wavelengths between 0.87 and 0.88 microns. Calibration filter 220 causes calibration instrument 100 to simulate the same temperature at all wavelengths of interest, i.e., over most of the emission range of the LED.

A calibration instrument without calibration filter 220 cannot simulate a single temperature at all wavelengths of light. As shown by FIG. 17, the emission curve of light source 115 does not match a blackbody curve. Specifically, the relative intensity of light source 115 at two different wavelength ranges does not match the relative intensity of a blackbody. For example, as shown in FIG. 16, a blackbody has a higher intensity at a wavelength of 0.925 microns than at a wavelength of 0.875 microns, whereas, as shown in FIG. 17, light source 115 has a lower intensity at a wavelength of 0.925 microns than at a wavelength of 0.875 microns. Therefore, if light source 115 generates the correct amount of radiation to simulate a blackbody at a predetermined temperature, e.g., 950° C., at one wavelength range, e.g., 0.87 to 0.88 microns, the light source cannot simulate a blackbody of the same temperature at a different wavelength range, e.g., 0.92 to 0.93 microns.

Because pyrometer filters 52 have different transmission ranges, a light source which simulates a blackbody at a predetermined temperature for one pyrometer will not simulate the same temperature for another pyrometer with a different pyrometer filter. However, adding calibration filter 220 causes calibration instrument 100 to generate the correct relative intensity of light to simulate a blackbody of a single temperature at all wavelengths of interest, thereby making the simulated temperature independent of the transmission range of pyrometer filter 52. This permits pyrometers with different pyrometer filters to be properly calibrated with the same calibration instrument.

Referring to FIGS. 5A–5B, a calibration instrument 100 which simulates a blackbody at a known temperature includes a generally cylindrical body 102 having an internal cavity 104. One end of cylindrical body 102 is closed, except for a small channel 110 defining an aperture through which light can pass out of cavity 104. A light emitting diode (LED) 115 positioned in cavity 104 emits light that passes out through channel 110.

In the described embodiment, body 102 is a machined aluminum cylindrical tube, 0.3745 inches in diameter and 2.0 inches long. Channel 110 extending between a bottom surface 130 of body 102 and cavity 104 is about 0.02 inches in diameter by about 0.02 inches long and is centered on the axis of the cylindrical body 102. At the end of body 102 in which channel 110 is located there is a narrower cylindrical region 132 having a diameter of about 0.30 inches and a length of about 0.10 inches. A circular outer edge 134 of the cylindrical body 102 surrounds a recessed annular rim 136. The outer edge 134 is beveled at a 45° angle to make it easier to insert the calibration instrument into an alignment tool that is described below.

Since the light output of the LED 115 varies as a function of temperature, means are also provided to stabilize the temperature of the LED. In particular, calibration instrument 100 also includes a small heating resistor 122, such as a fifty ohm (Ω) resistor, and a thermocouple 124, such as a K-type thermocouple, placed in close proximity to LED 115. Resistor 122 is used to heat the LED up to about 80° F., i.e., slightly above the expected ambient temperature. Alternatively, the LED could be cooled to a temperature below ambient. However, cooling would be a more difficult and costly alternative.

All three components (i.e., LED 115, thermocouple 124 and resistor 122) are secured in place by a thermoconductive ceramic 117, such as Azemco ceramiccast 583. Ceramic 117 ensures that the heat from heater 122 is efficiently transmitted to LED 115 and thermocouple 124. Ceramic 117 also holds the position of LED 115 constant relative to channel 110 so that no changes in light intensity occur due to shifting or rotation of LED 115 inside cavity 104.

Referring to FIG. 6, a power supply 120 supplies a constant current to LED 115. In the described embodiment, power supply 120 uses a laser diode (not shown) in a manner well known to those skilled in the art to stabilize the current through LED 115 and thereby stabilize its light output. Alternatively, the output power of LED 115 can be stabilized by using a photodiode (not shown) positioned so as to sample the light output of LED 115. In that case, the photodiode is connected through a feedback circuit to current source 120 to produce a constant light output from LED 115.

Thermocouple 124 and heater 122 are connected to a proportional integrated device (PID) controller 126 to form a feedback circuit to stabilize the temperature of LED 115. By holding both the temperature of LED 115 and current through LED 115 constant, LED 115 generates radiation with a very stable intensity.

Alternately, as shown in FIG. 14, the light output of LED 115 can be stabilized by using a laser diode driver 240 in conjunction with a photodiode 242 and a thermocouple 244. The driving power output of laser diode driver 240 is connected to the power input of LED 115. Photodiode 242 is positioned inside the casing of the LED to sample its light intensity and generate an intensity signal. The intensity signal from the photodiode is fed back into laser diode driver 240 to form a feedback loop so that the light output of calibration instrument 100 is extremely stable.

As noted above, the light output of the LED varies as a function of temperature. In particular, as the temperature of LED 115 increases, its light output drops. The output signal from thermocouple 244 may be connected through a coupler 246 to a modulation input of laser diode driver 240. Coupler 246 converts a signal of intensity x into a signal of intensity y according to the equation y=a−bx. The slope b and offset a of coupler 246 are set in a manner well known to those of skill in the art so that as the temperature of the LED drops, the power output of laser diode driver 240 increases, and the light output of the LED remains constant.

In another embodiment, the calibration instrument includes two or more light sources. The light from the light sources is combined to simulate a blackbody at a predetermined temperature over a predetermined wavelength range. The predetermine wavelength range may be in the infrared. Both light sources emit radiation with an approximately gaussian spectral distribution. However, the light sources have different bandwidths and intensity peaks at different wavelengths. The total spectral output $R(\tau)$ of the two light sources can be defined by the function:

$$R(\tau)=R_1(\tau)+K^*R_2(\tau)$$

where $R_1(\tau)$ and $R_2(\tau)$ are the spectral responses of the two light sources respectively, $\tau$ is the wavelength and K is an intensity coefficient. By selecting the appropriate value of K, the spectral output of the calibration instrument can simulate a blackbody at a specific temperature.

Referring to FIG. 19, a calibration instrument 300 using two light sources is constructed in a manner similar to the calibration instruments illustrated in FIGS. 5A–5B and 14. Calibration instrument 300 includes a generally cylindrical body 302 having an internal cavity 304. One end of the cylindrical body has an aperture 306 through which light can pass.

A chip 310 with two dies 312a and 312b formed thereon is suspended in internal cavity 304. Each die 312a and 312b includes an LED, 315a and 315b, respectively, and a photodiode, 318a and 318b, respectively. A temperature sensor 320, such as an "LM-34" sensor available from National Semiconductor Corporation of Santa Clara, Calif., is embedded in chip 310. The chip 310 including LEDs 315a and 315b, and photodiodes 318a and 318b, may be constructed generally as described in U.S. Pat. Nos. 5,525,539 and 5,448,082, the entire disclosures of which are hereby incorporated by reference. Such a chip may be ordered from Opto Diode Corporation, of Newbury Park, Calif. The chip 310 and temperature sensor 312 may be held in place in cavity 304 by set screws (not shown).

The LEDs 315a and 315b emit light that passes through a combiner 322 and a diffuser 324 to exit aperture 306. The combiner 322 combines the light emitted from the LEDs and directs the light to the aperture. The combiner 322 may be a mixer which mixes the light from LEDs 315a and 315b so that the wavelength distribution of the light passing through the aperture is spatially uniform. The mixer may be a twisted bundle of quartz optical fibers. The combiner may also be a partial mirror, a lens, or a beam splitter. The diffuser 324 transmissively scatters the light from combiner 322. Diffuser 324 may be a diffused glass filter.

Referring to FIG. 20, the schematic and idealized emission curves for LEDs 315a and 315b are shown by solid lines 330 and 332, respectively. The emission curves 330 and 332 have been normalized; i.e., the light intensity as a function of wavelength is shown as a percentage of the peak intensity. LED 315a emits light having a smooth, generally gaussian spectral distribution with a maximum intensity at 880 nanometers and a bandwidth (defined in this case as those wavelengths at which the normalized intensity is greater than 0.5) of about 80 nanometers which extends from about 840 to 920 nanometers. LED 315b also has a smooth, generally gaussian spectral distribution, but it has a maximum intensity at 930 nanometers and a bandwidth of about 50 nanometers which extends from about 905 to 955 nanometers.

Referring to FIG. 21, the emission curve in the wavelength range of about 0.870 to 0.930 microns for a blackbody at a temperature of 1,000° C. is shown by solid line 334. Emission curves for LEDs 315a and 315b are shown by solid line 330 and dashed line 332, respectively. The emission curve of the calibration instrument, as the combined light output of LEDs 315a and 315b, is shown by solid line 336. As illustrated, emission curve 336 substantially simulates blackbody radiation curve 334 in the illustrated wavelength range.

Returning to FIG. 19, LED 315a and photodiode 318a are connected to a laser diode driver 340a. Similarly, LED 315b and photodiode 318b are connected to a laser diode driver 340b. Each photodiode forms a feedback loop to stabilize the light output of its associated LED. Temperature sensor 320 may also be connected by a coupler 342 to the modulation inputs of the laser drivers 340a and 340b.

Laser diode drivers 340a and 340b may be used to control the relative intensities (i.e., the intensity coefficient K) of the two LEDs by adjusting the current flowing to the LEDs. By selecting an appropriate value for K, an emission curve 336 which substantially simulates the blackbody curve 334 may be generated.

To select the appropriate value of K, the calibration instrument is connected to a spectrometer and the relative intensity of the combined light of the two light sources is measured at two different wavelengths. One of the wavelengths should be selected to be substantially outside of the spectral range of one of the LEDs. If the spectral ranges overlap, the other wavelength should be selected to be in an overlapping region of the spectral ranges of the LEDs. If the spectral ranges do not overlap, then the other wavelength should be selected such that the normalized intensities of the two LEDs are approximately equal at that wavelength. For example, one wavelength may be 870 nanometers and the other wavelength may be 910 nanometers. The gain of one of the laser diode drivers is adjusted so that the ratio of the measured intensities at the two wavelengths is equal to the ratio predicted for a blackbody at a predetermined temperature. The intensity coefficient K is then set. The resulting spectral distribution simulates the radiation from a blackbody.

An advantage of using two light sources is that a blackbody may be simulated without the use of a calibration filter. Each calibration filter tends to have a slightly different transmission curve, which may not precisely match the emission curve of the LED. In contrast, the intensity coefficient K of the light sources can be selected during construction of the calibration instrument to ensure that a blackbody is being simulated.

During calibration, an alignment tool is used to align calibration instruments 100 or 300 with the light pipe of the temperature probe being calibrated. We shall give examples of two design types for this alignment tool. One design type is used in situ. That is, it aligns calibration instrument 100 with light pipe 40 without having to remove the light pipe from the system. The other design type is used to perform the calibration remotely. That is, light pipe 40 is removed from the RTP chamber and inserted into the alignment tool.

Referring to FIGS. 7, 8A–8D, and 9A–9C, an alignment tool 149 according to an embodiment which is used for in situ calibration is adapted to fit into the RTP chamber above the reflector plate. When inserted into the RTP chamber, alignment tool 149 holds the calibration instruments in a fixed position relative to the light pipes. More specifically, alignment tool 149 is a circular disk 150 with an arrangement of holes 154 into which individual calibration instruments 100 can be inserted. The number of holes 154 coincides with the number of thermal probes that are in the reflector plate. Holes 154 are located at different radii from the center of disk 150 and are positioned so that they coincide and are aligned with the locations of the conduits 35 in reflector plate 20 when alignment tool 149 is inserted into position within the chamber. As shown most clearly in FIGS. 8D and 9C, at the bottom of each small hole 154 there is a annular lip 158 defining a smaller diameter hole 155. Hole 155 has a diameter that is slightly larger than the diameter of the narrower cylindrical region 132 at the bottom of calibration instrument 100, and lip 158 has a thickness that is equal to the length of the narrower cylindrical region 132 on calibration instrument 100. Thus, when calibration instrument 100 is inserted into a hole 154, it comes to rest against lip 158 with its bottom surface 130 substantially flush with the bottom of disk 150 (i.e., flush with the surface of disk 150 that is proximate to the reflector plate when it is installed within the RTP chamber during a calibration).

In the described embodiment, alignment tool 149 may be made of plastic or nylon, e.g. Delrine. It may be about 1.0 inch thick and 8.9 inches in diameter. Each of holes 154 has an inside diameter of about 0.375 inches, which is slightly larger than the outside diameter of cylindrical body 102 so that calibration instrument 100 can be easily inserted into the hole. Annular lip 158 may be about 0.11 inches thick, and it may project inwardly by about 0.047 inches, so that the inner diameter of smaller hole 155 defined by annular lip 158 may be about 0.328 inches.

Returning to FIGS. 8A–8D, three projections 156 are located on the underside of disk 150. These projections 156 are spaced equidistant from each other around a circle with its center coinciding with the center of disk 150, and they are positioned so as to align with lift pin holes 67 located in the reflector plate in the RTP chamber when alignment tool 149 is inserted into the RTP chamber. Lift pins (not shown) may be operated to pass through the lift pin holes to raise and lower a substrate on support structure 62 (see FIG. 1).

As shown in FIG. 8C, each projection 156 has a cylindrical lower portion 161 with a first diameter and a bottom surface 163. Each projection 156 also has a cylindrical upper portion 165 with a larger second diameter to thereby form an annular step 162 at the point of transition from lower portion 161 to upper portion 165. The first diameter is slightly smaller than the diameter of the corresponding lift pin hole in the reflector plate, and the second diameter is larger than the diameter of the lift pin hole. Annular step 162 may be about 0.01 to 0.04 (e.g. 0.03) inches away from the bottom face of disk 150. Thus, when alignment tool 149 is inserted into the RTP chamber, lower portions 161 slide into their corresponding lift pin holes in the reflector plate and annular steps 162 hold the bottom face of disk 150 at a distance of about 0.03 inches above the surface of the reflector plate.

As shown in FIG. 8A, disk 150 also includes three larger holes 152, each located at a short distance radially inward from a corresponding one of projections 156. These holes 152, which may be about 0.75 inches in diameter, enable the user to see the location of the lift pins holes in the reflector plate when the alignment tool is being inserted into the RTP chamber. On the top side of disk 150, there is also a handle 160 with which the technician can lift and manipulate the disk as it is being inserted into the RTP chamber.

As shown in FIGS. 9A–9C, calibration instrument 100 is inserted into small hole 154. When the alignment tool is fully assembled into the RTP chamber, each small hole 154 and the calibration instrument 100 which it contains will be aligned with a corresponding one of the sapphire light pipes 40. By inserting a calibration instrument 100 into each of the eight holes 154, the eight pyrometers 50 may be calibrated simultaneously. Alternatively, a single calibration instrument 100 can be used and moved from one hole to the next for each calibration.

When calibration instrument 100 is positioned above a light probe by the alignment tool, there is typically about a 0.03 inch clearance between bottom 130 of calibration instrument 100 and the top of light pipe 40. Light pipe 40 is shown in FIG. 10 in two positions. One position (shown in phantom) has its top surface 41' close to calibration instrument 100, and the other position has its top surface 41" further from calibration instrument 100. Light emerges in a beam 140 from channel 110 with a spread angle α of about 90°. The exact angle α, of course, depends on the length and diameter of channel or aperture 110 and the position of LED 115 inside cavity 104. It is desirable that bottom 130 of calibration instrument 100 be close enough to surface position 41' so that the coverage of beam 140 will not expand to an area that is larger than the top surface of light pipe by the time it reaches light pipe 40. In other words, calibration instrument 100 should be close enough to light pipe 40 so that light pipe 40 captures substantially all of the light coming from calibration instrument 100. If that condition is satisfied, the temperature probe will be relatively insensitive to small changes in distance and alignment between calibration instrument 100 channel and light pipe 40. In contrast, if calibration instrument 100 is too far from light pipe 40 (e.g. more than about 0.1 inches for the described embodiment), as indicated by surface position 41", then the coverage of beam 140 will be larger than the diameter of the light pipe, which consequently will only capture a fraction of beam 140. The fraction which it captures will be quite sensitive to both alignment and the distance between calibration instrument 100 and the reflector plate.

To calibrate pyrometer 50, disk 150 is lifted by handle 160 and placed in chamber 60 so that projections 156 fit into lift pin holes 67. Calibration instruments 100 are fit into small holes 154, LED 115 is activated, and the temperature sampled by pyrometers 50 is recorded. The uncalibrated measurements are compared to the blackbody temperatures instruments 100 are known to simulate.

Another embodiment of the alignment tool which is also used for in situ calibration is shown in FIG. 11. Alignment tool 200 is partially integrated with a calibration instrument 180 that is of a slightly different design than the previously described calibration instrument. In this case, calibration instrument 180 is a cylindrical tube of uniform diameter throughout (i.e., without the narrower cylindrical region 132 shown in FIG. 5). Two alignment pins 185 project away from a surface 183 of the calibration instrument. Pins 185 slide into corresponding holes 187 located in the surface of reflector plate 20 on both sides of light pipe 40. When pins 185 are inserted into matching holes 187, channel 110 is aligned with light pipe 40. In this embodiment, for example, calibration instrument 180 is about 1.5 inches long and 0.5 inches in diameter, and pins 185 are each 0.30 inches long and 0.024 inches in diameter.

An embodiment which is used to calibrate temperature probes that have been removed from the RTP system is shown in FIG. 12. In this embodiment, the calibration instrument is replaced by a fixture 190 which has a cavity 191 in which LED 115 is mounted. Fixture 190 also includes a conduit 192 which is aligned along the axis of cavity 191 and sized to receive a light pipe 40 for calibration. A wall 195 with a narrow aperture 197 separates cavity 191 from conduit 192. Aperture 197, like channel 110 in the previously described embodiments, allows light from LED 115 to pass through into conduit 192 where the light pipe that is being calibrated is located. The rest of the calibration instrument including the electronics and the temperature stabilization circuitry are as previously described.

Another embodiment of the calibration instrument is shown in FIG. 18. In this embodiment, calibration instrument 250 includes a lighting fixture 252, an alignment fixture 254, and a fiber optic guide 256 connecting the lighting fixture to the alignment fixture. Lighting fixture 252 is a generally cylindrical body 260 having an internal cavity 262. A light source, such as LED 115 in casing 222, is placed inside cavity 262. An input end of fiber optic guide 256 is inserted into an opening 264 in the cylindrical body so that its input face 266 is positioned to receive light from the LED. The fiber optic guide 256 is secured in the cavity by set screws 267, or by some other mechanical or adhesive connector. Other optical components, such as calibration filter 220 or lens 224, may be positioned between the LED and the fiber optic guide. In addition, a diffused glass filter 269 which transmissively scatters light may be inserted between LED 115 and input face 266. The electronic control of LED 115 is as previously described with reference to FIG. 14.

Light radiated by LED 115 enters fiber optic guide 256 through input face 266 and travels through the fiber optic guide to an output face 268. Fiber optic guide 256 is a twisted bundle of quartz optical fibers. The entire twisted bundle may be about three or four millimeters in diameter, and the individual quartz optical fibers may be about fifty microns in diameter. In a twisted bundle of fibers, the individual quartz fibers are "tangled"; i.e., they cross paths, so that the relative position of a fiber at input face 266 need not match the relative position of the same quartz fiber at output face 268. Thus, the light which enters the bundle through input face 266 is "randomized", i.e., redistributed, at output face 268. Consequently, after the unevenly distributed light from LED 115 passes through fiber optic guide 256, the light intensity across output face 268 is evenly distributed.

The output end of fiber optic guide 256 is secured in alignment fixture 254 by set screws 270, although other mechanical or adhesive methods of connection could be used. Alignment fixture 254 may be a machined aluminum cylindrical tube 255 about two inches long and one-third of an inch in diameter. Both ends of cylindrical tube 255 are open, and fiber optic guide 256 extends through the tube so that output face 268 is flush with the bottom surface of disk 150. In other respects, the exterior physical configuration of the alignment fixture is similar to the calibration instrument described with reference to FIGS. 5A–5B. Specifically, the lower end of the exterior surface of alignment fixture 254 includes a narrow cylindrical region 272 and an annular step 274.

Alignment fixture 254 is inserted into small hole 154 of alignment tool 149 so that annular step 274 of the alignment fixture rests against lip 158 of the alignment tool and output face 268 of the fiber optic guide is substantially flush with the bottom of disk 150. In this configuration, the exit face of the fiber optic guide is positioned above and aligned with sapphire light pipe 40. Light from LED 115 passes through the fiber optic guide and is sampled by the light pipe 40.

The output face 268 of fiber optic guide 256 simulates a blackbody substrate placed in front of the light pipe. A blackbody substrate has a large surface area in comparison to the sampling area of light pipe 40, and the surface of the substrate radiates light in all directions. Similarly, output face 268 of fiber optic guide 256 emits radiation over a relatively wide area in comparison to the sampling area of the light pipe, and the radiation emerging from output face 268 has a wide angular spread. In addition, the intensity of LED 115 is set so that calibration instrument 250 emits the same amount of radiation as would a blackbody that is heated to a predetermined temperature. Therefore, calibration instrument 250 simulates a blackbody substrate at a predetermined temperature.

A method for calibrating pyrometers 50 using the above-described embodiments is shown in FIG. 13. First, a reference pyrometer is calibrated to correctly read blackbody temperatures (step 200). This can be done with the assistance of a standards organization, such as, for example, the National Institute of Standards and Technology (NIST), which has available calibrated sources for generating an accurately known blackbody radiation spectrum for a given temperature. The reference pyrometer is calibrated to produce an accurate temperature reading from the blackbody reference standard.

With an accurately-calibrated reference pyrometer, the effective blackbody temperature $T_{eff}$ that is generated by a calibration instrument is then measured (step 205). Note that it is likely that each calibration instrument will simulate a slightly different blackbody temperature due to differences in electronics, the positioning of LED 115 inside chamber 104, etc. Thus, each calibration instrument should be measured individually and labeled according to the temperature which it simulates. For example, one calibration instrument 100 might simulate 843° C.; whereas, another calibration instrument might simulate 852° C.

The calibration instrument can be labelled in a number of ways. A label 203 with the simulated temperature might be directly affixed to the probe. Alternately, the probe might be affixed with a part number, code, or other identifying marker. In this case, the part number, code, or identifying marker might be indexed to the simulated temperature in a separate list.

The calibration instruments are then used to calibrate the uncalibrated thermal probes (step 210). Specifically, using the alignment tool, the calibration instrument is aligned with the light pipe 40, the LED 115 is activated, and a temperature Tm that is produced by the pyrometer 50 is read.

Finally, the gain of the pyrometer is adjusted to produce a measured temperature $T_m$ that equals $T_{eff}$; i.e., the blackbody temperature that is simulated by the calibration instrument (step 215).

In summary, the reference pyrometer is calibrated to the standard at the NIST, the calibration instruments are calibrated to the reference pyrometer, and the pyrometers are calibrated to the calibration instruments. Therefore, the calibration of the pyrometers may be traced back to the standard. Since the standard is an accurate blackbody temperature source, the pyrometer temperature measurements are also accurate.

In the case of in situ calibrations, the calibration instrument can also be used to detect when thermal probes within a chamber have gone out of calibration due to particle contamination, drifting electronics, or whatever. The measured temperature Tm from the calibration instrument can be compared with the known effective temperature $T_{eff}$ of the calibration instrument. If the difference $T_{eff}-T_m$ exceeds a predetermined threshold, the thermal probes can be cleaned, recalibrated, or simply replaced.

Other embodiments are within the scope of the following claims. For example, though the above-described embodiment used an LED as the light source, other stable light sources, such as a laser diode with appropriate stabilization control circuitry, can be used.

What is claimed is:

1. An apparatus for calibrating a temperature probe that measures the temperature of a substrate, comprising:
    a) a first light source having a first spectral range;
    b) a second light source having a second spectral range, the second spectral range different from the first spectral range; and
    c) means for combining the light from the first and second light sources and directing the combined light to a light emitting region, wherein the relative intensities of the first and second light sources are selected such that a radiation spectrum emitted from the light emitting region substantially simulates a radiation spectrum of a blackbody at a predetermined temperature over a predetermined wavelength range.

2. A method of calibrating a calibration instrument, comprising:
    a) generating light from a first light source in the calibration instrument, the light from the first light source having a first spectral range;
    b) generating light from a second light source in the calibration instrument, the light from the second light source having a second spectral range different from the first spectral range;
    c) combining the light from the first and second light sources;
    d) measuring the intensity of the combined light at a first wavelength;
    e) measuring the intensity of the combined light at a second wavelength; and
    f) adjusting the relative intensities of the first and second light sources such that a ratio of the intensity at the first wavelength to the intensity at the second wavelength is substantially equal to an intensity ratio predicted for a blackbody at a predetermined temperature.

3. The method of claim 2 wherein the first spectral range overlaps a portion of the second spectral range, and wherein the first wavelength is within the overlapping portion and the second wavelength is outside the first spectral range.

4. The method of claim 2 wherein the first and second spectral ranges do not overlap, and wherein the first wavelength is selected such that the first and second light sources have approximately equal normalized intensities at the first wavelength.

5. An apparatus for calibrating a temperature probe that measures the temperature of a substrate, comprising:
   a) a first light source to emit light having a first spectral range;
   b) a second light source to emit light having a second spectral range, the second spectral range different from the first spectral range; and
   c) a light emitting region optically coupled to the first and second light sources, wherein the relative intensities of the first and second light sources are such that the total radiation emitted from the light emitting region substantially simulates a blackbody at a predetermined temperature over a predetermined wavelength range.

6. The apparatus of claim 5 further comprising an alignment mechanism with an alignment structure that engages the input end of the temperature probe.

7. An apparatus for calibrating a temperature probe that measures the temperature of a substrate, comprising:
   a) a first light source to emit light having a first spectral range;
   b) a second light source to emit light having a second spectral range, the second spectral range different from the first spectral range;
   c) a light emitting region optically coupled to the first and second light sources, wherein the relative intensities of the first and second light sources are such that the total radiation emitted from the light emitting region substantially simulates a blackbody at a predetermined temperature over a predetermined wavelength range; and
   d) an alignment mechanism having an alignment structure to engage a corresponding alignment feature of a thermal processing chamber to align the light emitting region with an input end of the temperature probe.

8. The apparatus of claim 7 further comprising a light combiner positioned to receive light from the first and second light sources and direct the combined light to the light emitting region.

9. The apparatus of claim 7 wherein the first and second light sources each emit light with an approximately gaussian intensity distribution.

10. The apparatus of claim 7 wherein the first and second light sources have intensity peaks at different wavelengths.

11. The apparatus of claim 7 wherein the first and second light sources comprise LEDs.

12. The apparatus of claim 7 wherein the predetermined wavelength range is in the infrared.

13. An apparatus of claim 7 wherein the light emitting region is a surface of an optical fiber.

14. An apparatus of claim 7 wherein the light emitting region is an aperture in a structure enclosing the first and second light sources.

15. A method of calibrating a temperature probe that measures the temperature of a substrate, comprising:
   a) generating light from a first light source having a first spectral range;
   b) generating light from a second light source having a second spectral range different from the first spectral range;
   c) combining the light from the first and second light sources;
   d) directing the combined light to a light emitting region;
   e) selecting the relative intensities of the first and second light sources such that a radiation spectrum emitted from the light emitting region substantially simulates a radiation spectrum of a blackbody at a predetermined temperature over a predetermined wavelength range; and
   f) directing the combined light from the light emitting region into an input end of a temperature probe that measures the temperature of a substrate in a thermal processing chamber.

* * * * *